(12) United States Patent
Duan et al.

(10) Patent No.: US 8,829,119 B2
(45) Date of Patent: Sep. 9, 2014

(54) POLYARYLENE COMPOSITIONS FOR DOWNHOLE APPLICATIONS, METHODS OF MANUFACTURE, AND USES THEREOF

(75) Inventors: Ping Duan, Cypress, TX (US); Gaurav Agrawal, Aurora, TX (US); David P. Gerrard, Magnolia, TX (US)

(73) Assignee: Baker Hughes Incorporated, Houston, TX (US)

( * ) Notice: Subject to any disclaimer, the term of this patent is extended or adjusted under 35 U.S.C. 154(b) by 239 days.

(21) Appl. No.: 13/246,250

(22) Filed: Sep. 27, 2011

(65) Prior Publication Data
US 2013/0079427 A1    Mar. 28, 2013

(51) Int. Cl.
*D06M 14/00*     (2006.01)
*C08L 65/02*     (2006.01)
*C08G 61/10*     (2006.01)
*C08F 246/00*    (2006.01)

(52) U.S. Cl.
CPC .......... *C08G 61/10* (2013.01); *C08G 2261/592* (2013.01); *C08L 65/02* (2013.01); *C08G 2261/135* (2013.01); *C08G 2261/312* (2013.01); *C08G 2261/76* (2013.01)
USPC ....... 525/330.9; 525/331.8; 528/86; 528/396; 521/50; 521/71; 521/79

(58) Field of Classification Search
USPC ......... 528/86, 396; 525/330.9, 331.8; 521/50, 521/71, 79
See application file for complete search history.

(56) References Cited

U.S. PATENT DOCUMENTS

| | | |
|---|---|---|
| 3,782,458 A | 1/1974 | Slack |
| 3,793,281 A | 2/1974 | Acle, Jr. |
| 3,954,932 A | 5/1976 | Coale |
| 4,020,054 A | 4/1977 | Fodor |
| 4,137,970 A | 2/1979 | Laflin et al. |
| 4,191,254 A | 3/1980 | Baughman et al. |
| 4,308,352 A | 12/1981 | Knaus |
| 4,414,269 A | 11/1983 | Lubowitz et al. |
| 4,415,269 A | 11/1983 | Fraser |
| 4,431,761 A | 2/1984 | Hergenrother |
| 4,475,847 A | 10/1984 | Cornely et al. |
| 4,591,615 A | 5/1986 | Aldred et al. |
| 4,940,733 A | 7/1990 | Kuphal et al. |
| 5,272,247 A | 12/1993 | Sotokawa et al. |
| 5,580,931 A | 12/1996 | Aguirre |
| 5,789,083 A | 8/1998 | Thomas |
| 5,803,172 A | 9/1998 | Rajkovich |
| 5,886,130 A | 3/1999 | Trimmer et al. |

(Continued)

FOREIGN PATENT DOCUMENTS

| | | |
|---|---|---|
| JP | 59157151 A | 9/1984 |
| JP | 9096186 A | 4/1997 |

(Continued)

OTHER PUBLICATIONS

PrimoSpire PR-250 Product Data Sheet, Solvay Specialty Polymers, Sep. 28, 2010, 3 pages.

(Continued)

*Primary Examiner* — Duc Truong
(74) *Attorney, Agent, or Firm* — Cantor Colburn LLP

(57) ABSTRACT

A crosslinked product of a polyarylene is disclosed, having high-temperature elastomeric properties and excellent chemical resistance. The crosslinked materials are useful in oil and gas downhole applications in the form of either solids or foams. Methods for the manufacture of the crosslinked product and articles comprising the product are also disclosed.

32 Claims, 7 Drawing Sheets

(56) References Cited

U.S. PATENT DOCUMENTS

| | | | |
|---|---|---|---|
| 5,976,437 | A | 11/1999 | Marrocco, III et al. |
| 6,001,934 | A | 12/1999 | Yamanaka et al. |
| 6,446,717 | B1 | 9/2002 | White et al. |
| 6,854,522 | B2 | 2/2005 | Brezinski et al. |
| 6,896,063 | B2 | 5/2005 | Chang et al. |
| 6,907,937 | B2 | 6/2005 | Whanger et al. |
| 6,976,537 | B1 | 12/2005 | Verret |
| 6,977,057 | B2 | 12/2005 | Reitz et al. |
| 7,045,082 | B2 | 5/2006 | Dietzen et al. |
| 7,109,249 | B2 | 9/2006 | Bruza et al. |
| 7,268,193 | B2 | 9/2007 | Marrocco, III et al. |
| 7,387,158 | B2 | 6/2008 | Murray et al. |
| 7,392,852 | B2 | 7/2008 | Richard |
| 7,655,705 | B2 | 2/2010 | Scherzer et al. |
| 8,048,348 | B2 | 11/2011 | Duan et al. |
| 2003/0132271 | A1 | 7/2003 | Kao et al. |
| 2004/0112478 | A1 | 6/2004 | Bieler et al. |
| 2004/0138321 | A1 | 7/2004 | Hashimoto et al. |
| 2006/0011267 | A1 | 1/2006 | Kay et al. |
| 2006/0051540 | A1 | 3/2006 | Kagawa |
| 2006/0125136 | A1 | 6/2006 | Kratzmuller |
| 2007/0072828 | A1 | 3/2007 | Yoo |
| 2007/0240877 | A1 | 10/2007 | O'Malley et al. |
| 2008/0220567 | A1 | 9/2008 | Mahler et al. |
| 2009/0036605 | A1 | 2/2009 | Ver Meer |
| 2009/0084539 | A1 | 4/2009 | Duan et al. |
| 2010/0012708 | A1 | 1/2010 | Steward et al. |
| 2010/0089565 | A1 | 4/2010 | Duan et al. |
| 2011/0052444 | A1 | 3/2011 | Hrametz et al. |
| 2011/0139314 | A1 | 6/2011 | Ho et al. |
| 2012/0178834 | A1 | 7/2012 | Linder et al. |
| 2012/0305238 | A1 | 12/2012 | Duan et al. |
| 2013/0062049 | A1 | 3/2013 | Ren et al. |

FOREIGN PATENT DOCUMENTS

| | | | |
|---|---|---|---|
| WO | WO9207024 | A1 | 4/1992 |
| WO | 2005059304 | A1 | 6/2005 |
| WO | 2007101845 | | 9/2007 |
| WO | 2010095139 | | 8/2010 |

OTHER PUBLICATIONS

Sun, Hongliu, "Preparation, characterization, and mechanical properties of some microcellular polysulfone foams", Journal of Applied Polymer Science, vol. 86, Issue 7, pp. 1692-1701, Nov. 14, 2002 (abstract).

Dan Lu et al., "Effects of Ball Milling Dispersion of Nano-SiOx Particles on Impact Strength and Crystallization Behavior of Nano-SiOx-Poly(phenylene sulfide) Nanocomposites, "Polymer Engineering and Science, 2006, pp. 820-825.

International Search Report and Written Opinion; International Application No. PCT/US2012/045550; International filing date: Jul. 5, 2012; Date of mailing Jan. 25, 2013; 8 pages.

International Search Report and Written Opinion; International Application No. PCT/US2012/045552; International filing date: Jul. 5, 2012; Date of mailing Jan. 25, 2013; 8 pages.

International Search Report and Written Opinion; International Application No. PCT/US2012/054083; International filing date Sep. 7, 2012; Date of mailing Dec. 14, 2012 (8 pages).

International Search Report for International Application No. PCT/US2012/057033; International filing date: Sep. 25, 2012; Date of mailing: Mar. 29, 2013 (4 pgs).

International Search Report for International Application No. PCT/US2012/059682; International filing date: Oct. 11, 2012; Date of mailing: Mar. 29, 2013 (4 pgs).

International Search Report for International Application No. PCT/US2012/061098; International filing date: Oct. 19, 2012; Date of mailing: Mar. 12, 2013 (3 pgs).

Mather, et al.; "Shape Memory Polymer Research"; Annu. Rev. Mater. Res.; 39; pp. 445-471; (2009).

Meng, et al.; "A Review of Shape Memory Polymer Composites and Blends"; Composites: Part A; 40; pp. 1661-1672; (2009).

Ren, et al.; "Development and Characterization of an Elastomeric Material for High-Pressure and High-Temperature Downhole Sealing Applications"; Presentation at 2011 World Oil HPHT Drilling and Completion Conference; Abstract Date Mar. 11, 2011; only one page.

Richard T. Hawkins, "Chemistry of the Cure of Poly(p-phenylene sulfide)" Macromolecules, vol. 9.No. 2, 1976, pp. 189-194.

Aging 39.3 Hrs.

Aging 39.3 Hrs.

POLYARYLENE COMPOSITIONS FOR DOWNHOLE APPLICATIONS, METHODS OF MANUFACTURE, AND USES THEREOF

BACKGROUND

In downhole drilling and completion (for example gas and oilfield exploration and production, carbon dioxide sequestration, etc.) elastomers are used in applications as diverse as packer elements, blow out preventer elements, O-rings, gaskets, and the like. The elastomers are often exposed to high temperatures and harsh chemical and mechanical subterranean environments that can degrade elastomer performance over time, reducing their reliability.

An elastomer having good chemical resistance maintains its mechanical properties, for example elasticity, extrusion resistance, and integrated structural strength, when it is contacted with various chemicals. In downhole drilling and completion applications, these chemicals include various corrosive water- and oil-based downhole fluids. Thus, in the oil and gas industry, it is more important to for an elastomer to maintain its mechanical properties under "wet" rather than under "dry" conditions at given temperature and service time.

Even with the most recent technologies, there nonetheless remains a need for elastomers, or any other polymeric materials, that function well and maintain their mechanical properties at high temperatures under wet conditions. High temperature polymers that are chemically resistant under dry conditions alone are readily available. Such polymers include certain thermoplastic polyimides (TPI) and polybenzimidazoles (PBI). Chemically resistant polymers useful under wet conditions at low temperature are also readily available. Examples of these polymers include certain polyethylenes and polypropylenes. Under conditions of high temperature and corrosive fluids, fluoropolymers are often used, as they are generally considered to have the best thermal stability and chemical resistance. Examples of fluoropolymers include polytetrafluoroethylene, and certain other fluoroelastomers and perfluoroelastomers. Certain grades of fluoropolymers are claimed to have a maximum continuous service temperature of 327° C. However, even the best perfluoroelastomers can become soft at high temperature over time, losing their capability to seal gaps under high pressure. Also, fluoroelastomers or perfluoroelastomers tend to develop cracks when contacted with various downhole fluids at high temperature.

Other types of polymers such as polyetheretherketone (PEEK) or polyphenylene sulfide (PPS) have been widely used in downhole environment as the backup rings. These polymers are rigid semi-crystalline thermoplastics and can withstand high heat and exposure to caustic chemicals. However, these polymers lack elasticity and they are not desirable to be used as sealing materials. Furthermore, it is found that these polymers tend to become brittle and break apart when contacted with various corrosive downhole fluids at high temperature.

Other polymeric materials, for example linear amorphous thermoplastics such as polysulfone are known and widely used as adhesives, composites, or moldings for automobiles, household appliances, and other applications. However, linear amorphous thermoplastics tend to creep under load, especially at elevated temperatures. Furthermore, these polymeric materials are sensitive to various solvents, which significantly limits their use in downhole drilling and completion. Attempts to modify the properties if polysulfones have included crosslinking. For example, U.S. Pat. No. 4,431,761 discloses a method to chemically replace the end groups of hydroxyl-terminated polyethersulfone to provide ethynyl-terminated polyethersulfones that can then be thermally crosslinked. U.S. Pat. No. 4,414,269 discloses a method to functionalize polysulfones with the condensation products of amino-phenols and acid anhydrides, which are thermally crosslinkable. However, these methods require additional chemical reaction steps involving expensive chemicals and solvents. Furthermore, these methods are limited to polysulfones having functional end groups such as hydroxyl-terminated polyethersulfone. Polyethersulfone tends to degrade and becomes brittle in various corrosive downhole fluids at elevated temperature. Other polysulfones such as polyphenylene sulfone (PPSU) have a better chemical resistance than polyethersulfone. PPSU can be crosslinkable via a thermal oxidation process by adding a small amount of an oxidant such as a peroxide. This crosslinked PPSU exhibits good high temperature (250° C. or above) rubbery behavior under dry conditions, but when contacted with aggressive corrosive downhole fluid, it tends to become brittle and break apart.

Despite extensive research directed to replacing elastomers or increasing their resistance to degradation under downhole conditions, there remains a need in the oil and gas drilling and completion industry for elastomers having improved chemical resistance, particularly at high temperatures. It would be a further advantage if the improved chemical resistance could be obtained without significantly adversely affecting other desirable properties of the elastomers for downhole applications, for example mechanical properties such as elasticity, extrusion resistance, and integrated structural strength. There remains a particular need for elastomers useful in devices such as packers, blow out preventer elements, O-rings, gaskets, and the like that retain good mechanical properties at high temperature when in contact with corrosive downhole fluids over continuous service times.

SUMMARY

The above and other deficiencies of the prior art are overcome by, in an embodiment, a crosslinked product of a polyarylene of formula (1)

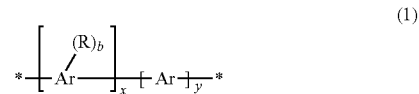

wherein
each Ar is the same or different, and is independently a C6-C32 aromatic group having only carbon atoms in the ring,
R is a substituent on the aromatic group wherein each R is the same or different, and each R is independently a C1-C20 hydrocarbyl group, C1-C20 hydrocarbyloxy group, C1-C20 hydrocarbylthio group, trialkylsilyl group, halogen, nitro group, cyano group, hydroxyl group, mercapto group, hydrocarbyl carbonyl group formyl group, C1-C20 dihydrocarbyl ether group, carboxylic acid group or a salt thereof, carboxylic ester group, primary, secondary or tertiary amino group, primary or secondary aminocarbonyl group, phosphonic acid group or a salt thereof, sulfonic acid group or a salt thereof, polyalkyleneoxy group, or polyphenyleneoxy group,
b is an integer from 0-10, provided that the valence of Ar is not exceeded; and
x and y the same or different, and either x or y can be zero, provided that x+y is greater than about 10.

In another embodiment, a method for the manufacture of the above crosslinked product of a polyarylene comprises heating the polyarylene of formula (1) in presence of a crosslinking agent at a temperature and for a time effective to form the crosslinked polyarylene.

In still another embodiment, a downhole article comprises above crosslinked polyarylene.

A method of forming a downhole article comprises forming a preform of the downhole element comprising the above polyarylene; and heating the preform at a temperature and for a time in presence of a crosslinking agent effective to crosslink the polyarylene to provide the article.

Another method of forming a downhole article comprises forming particles comprising the above crosslinked polyarylene; and shaping the particles to provide the article.

BRIEF DESCRIPTION OF THE DRAWINGS

The following descriptions should not be considered limiting in any way. With reference to the accompanying drawings.

DETAILED DESCRIPTION

Figure 1:
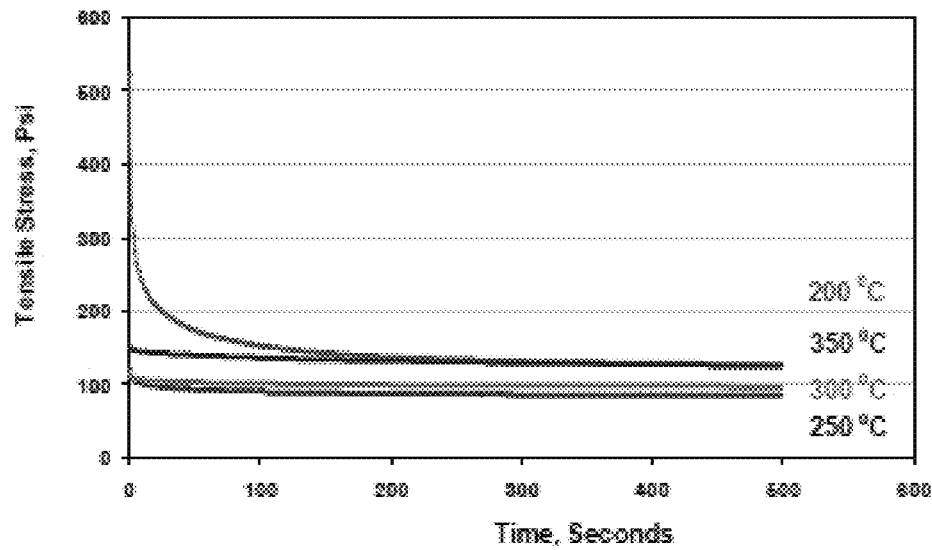
FIG. 1 shows the results of tensile stress relaxation testing of a crosslinked polyarylene at 200° C., 250° C., 300° C., and 350° C.

Described herein is a new method for the manufacture of high temperature elastomers from linear amorphous high temperature thermoplastics such as polyarylenes. These new high temperature elastomers are rigid and tough at room temperature, but behave as rubbery materials at temperatures above room temperature. The new elastomers have excellent elasticity, extrusion resistance, and integrated structural strength at high temperatures. In a particularly advantageous feature, the elastomers have improved chemical resistance under wet conditions, maintaining their excellent properties even under continuous use downhole.

Traditionally, a polymer classified as an elastomer (a rubbery material) has a glass transition temperature (Tg) below room temperature. These elastomers become soft and thermally degrade over time when used at high temperature. Degradation is accelerated when these elastomers are exposed to corrosive fluids combined with high temperature, such that the elastomers can be completely destroyed within a short period of time (e.g., days or even hours). One approach to improving high temperature chemical resistance has been to replace carbon in the elastomer backbone with a non-carbon element such as silicone, to provide a silicone rubber. Another approach has been to maintain the carbon backbone of the elastomer, but replace hydrogen with fluorine.

The methods described herein represent a different approach, based on the recognition that it is not necessary for the elastomer to have a Tg that is below room temperature. The new elastomers disclosed herein have instead been designed to have a Tg above room temperature, but lower than the minimal application temperature (MAT) of the elastomer. Thus, the elastomers are more similar to engineering plastics (rigid and strong) below the MAT, but elastomeric above the MAT. Candidates for new high temperature elastomers are therefore not limited to those polymers within the traditional classifications of elastomer materials. Rather, any polymer having good elasticity above the MAT, can be developed, evaluated, or used.

Potential materials for the manufacture of the high temperature elastomers include linear amorphous thermoplastic polymers that are capable of being molecularly crosslinked. Molecular chains of linear amorphous thermoplastic polymers behave like "random coils." After crosslinking, the coils tend to deform proportionally in response to an outside-applied force, and upon release of the outside-applied force, the coils tend to recover to their original configuration. In contrast, molecular chains of crystalline or semi-crystalline polymers are regularly aligned with each other. Outside-applied force tends to destroy molecular regularity and thus generate permanent deformation, especially when the materials are subjected to constant or high stretching/deformation. The degree of molecular crosslinking of the linear amorphous thermoplastic polymers can be adjusted based on the material selected and the intended use of the high temperature elastomer. In an embodiment, the degree of crosslinking is low, so as to provide optimal elasticity. If the degree of crosslinking is high, rigidity and/or brittleness of the high temperature elastomer can increase.

Accordingly, there is provided in an embodiment a thermally crosslinked polyarylene useful as a high temperature elastomer in downhole and completion applications. In an embodiment, the high temperature elastomer is manufactured by heating a polyarylene powder in the presence of oxygen to a high temperature, such as at or above 350° C., for example inside an oven for at least 8 hours. The polyarylene is crosslinked via an oxidization process. The oxygen may come from the air, or a pure or impure oxygen source.

The polyarylenes used for crosslinking comprise repeating units of formula (1)

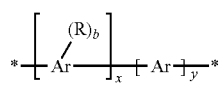

wherein
each Ar is the same or different, and is independently a C6-C32 aromatic group having only carbon atoms in the ring, R is a substituent on the aromatic group wherein each R is the same or different, and each R is independently a C1-C20 hydrocarbyl group, C1-C20 hydrocarbyloxy group, C1-C20 hydrocarbylthio group, trialkylsilyl group, halogen, nitro group, cyano group, hydroxyl group, mercapto group, hydrocarbyl carbonyl group (—C(O)C1-C20 hydrocarbyl), formyl group (—C(O)H), C1-C20 dihydrocarbyl ether group (—(C1-C10 hydrocarbyl)-O—(C1-C10 hydrocarbyl)), carboxylic acid group (—C(O)OH) or a salt thereof, carboxylic ester group (—C(O)O(C1-C12 hydrocarbyl)), primary, secondary or tertiary amino group (—NH$_2$, —NH(C1-C12 hydrocarbyl), —N(C1-C12 hydrocarbyl)$_2$, primary or secondary aminocarbonyl group (—C(=O)NH$_2$, —C(O)NH (C1-C12 hydrocarbyl) phosphonic acid group (—P(O) (OH)$_2$) or a salt thereof, sulfonic acid group (—S(O)$_2$(OH)) or a salt thereof, polyalkyleneoxy group (—O(C1-C4)alkyl)$_n$ wherein n is 2-12), or polyphenyleneoxy group (—O(C6-C10 aryl)$_n$ wherein n is 2-12).

b is an integer from 0-10, provided that the valence of Ar is not exceeded; and x and y the same or different, and either x or y can be zero, provided that x+y is greater than about 10.

Different Ar groups can be present in the polyarylenes, for example a combination of units that contain a phenylene group and units that contain a naphthylene group. In addition, each unit can have a different pattern of substitution on the Ar groups, for example a combination of units that is unsubstituted (n=0) and units that are substituted.

In a specific embodiment the polyarylenes used for crosslinking are polyarylenes of formula (2)

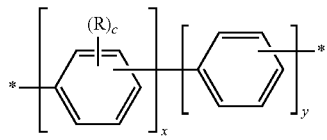

wherein
each R is the same or different, and is as defined in formula (1),
c is an integer from 0 to 4, and
x and y are as defined in formula (1).

In an embodiment, each R is the same or different, and is a linear or branched C1-C10 alkyl, linear or branched C2-C10 alkenyl, linear or branched C2-C10 alkynyl, C6-C18 aryl, C7-C20 alkylaryl, C7-C20 arylalkyl, C5-C10 cycloalkyl, C5-C20 cycloalkenyl, linear or branched C1-C10 alkylcarbonyl, C6-C18 arylcarbonyl, halogen, nitro, cyano, carboxylic acid or a salt thereof, phosphonic acid or a salt thereof, or sulfonic acid or a salt thereof.

In another embodiment each R is the same or different, and is a linear or branched C1-C6 alkyl, C6-C12 aryl, C7-C13 alkylaryl, C7-C13 arylalkyl, linear or branched C1-C6 alkylcarbonyl, C6-C12 arylcarbonyl, C7-C13 alkylarylenecarbonyl, C7-C13 arylalkylene carbonyl, halogen, nitro, cyano, carboxylic acid or a salt thereof, phosphonic acid or a salt thereof, or sulfonic acid or a salt thereof, and c is an integer from 0 to 4, specifically 0 to 3, or 0 to 2. Alternatively, c can be an integer from 1 to 4, 1 to 3, or 1 to 2, and x is greater than 1, or both x and y are integers greater than 1.

In another embodiment each R is the same or different, and is a linear or branched C1-C6 alkyl, C6-C12 arylcarbonyl, or halogen, and c is an integer from 0 to 4, specifically 0 to 3, or 0 to 2. Alternatively, c can be an integer from 1 to 4, 1 to 3, or 1 to 2, and x is greater than 1 or both x and y are integers greater than 1.

In still another embodiment, each R is C6-C12 arylcarbonyl, e.g., 2-naphthoyl, benzoyl, 2-methylbenzoyl (2-toluoyl), —C(O)-(1,4-phenylene-O-1,4-phenylene-C(O)—)$_x$-phenyl, or 4-phenoxybenzoyl, c is one and x and y are both integers greater than 1. Specifically, R is benzoyl, c is 1, and x and y are both integers greater than 1.

The polyarylenes used for crosslinking can be linked through the para positions as illustrated in formula (2a), the meta positions, the ortho positions, or a combination of para and meta position as illustrated in formula (2b).

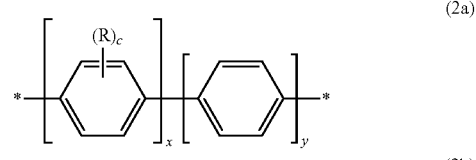

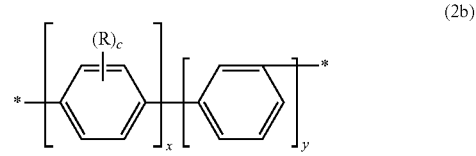

The linking of the unsubstituted phenylene units can be at least 90%, at least 95%, or 99% para, with the remaining linkages being ortho or meta. In an embodiment, the polyarylenes are linked at the para positions on the substituted phenylene and a combination of para, ortho, and meta positions on the unsubstituted phenylene as shown in formula (2c).

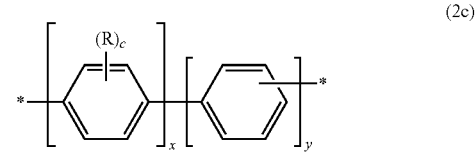

The polyarylenes can have at least 95% para linkages, specifically at least 99% para linkages in the polymer. The substituted and unsubstituted units can be in any linear configuration, e.g., alternating (ABAB), or block (AABB). In an embodiment, the unsubstituted units are present in blocks having 2 or more, 6 or more, 8 or more, or 10 or more units. The ratio of x:y in the polyarylenes can vary from 1:99 to 99:1, for example, although it is possible to have ratios of x:y of 1:1000 to 1:10.

The polyarylenes contain 50% or more, 85% or more, 90% or more, 95% or more, or 99% or more of the units of formula (1) based on the total number of repeat units in the polymers. Other units that can be present include, for example, units of formula (3)

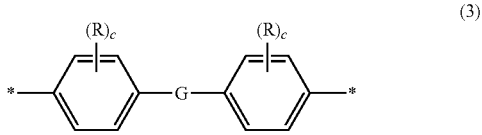

wherein
each R is the same or different and is as defined in formula (1),
c is as defined in formula (2), and
G is —O—, —S—, CH$_2$—, —OCH$_2$—, —O(C6-C12 aryl)-, —O(C6-C12 aryl)-O)$_m$—, —(CH$_2$)$_m$—, —C(O)—, —C(O)$_2$—, —O(CH$_2$CH$_2$O)$_m$—, —(CF$_2$)$_m$—, —C(O)(C6-C12 aryl)C(O)—. In an embodiment, the polyarylenes contain only units of formula (1), specifically units of formula (2), and terminal groups.

The polyarylenes can be linear or branched, having 1 or more, 2 or more, or 5 or more branching points per 1,000 carbon atoms along the polymer chain. In an embodiment, the polyarylenes are linear, having 10 or fewer, 5 or fewer, 2 or fewer, or 1 or fewer branching points per 1,000 carbon atoms along the polymer chain.

In an embodiment, the polyarylenes for crosslinking have a glass transition temperature (Tg) of about 100 to about 150° C.

The polyarylenes for crosslinking can further have a weight average molecular weight (Mw) of about 500 to about 100,000 grams/mole (g/mol), specifically about 1,000 to about 75,000 g/mol, more specifically about 1,500 to about 50,000 g/mol, and still more specifically about 2,000 to about 25,000 g/mol.

The polyarylenes for crosslinking are further characterized by relatively high tensile strength and Young's modulus (stiffness), as well as ductile mechanical deformation behavior. The polyarylenes can have a tensile yield strength of 18,000 to 25,000 psi (124 to 172 MPa), a tensile modulus of 700 to 900 KPsi (4.8 to 6.2 GPa), and a tensile elongation of 5%, 7%, 8%, or higher. The polyarylenes for crosslinking can further have a compressive strength of up toe 35,000 psi (242 MPa).

A combination of different polyarylenes can be used for crosslinking, for example polyarylenes of different molecular weights, different substitution patterns, different viscosities, and/or different degrees of branching.

Exemplary polyarylenes that can be used include those generally known as "self-reinforcing polyphenylene," which are commercially available under the tradename Primo-Spire® PR-250 from Solvay Advanced Polymers.

As described above, the high temperature elastomers, in particular the crosslinked polyarylenes, are prepared by oxidative crosslinking in the presence of a molecular crosslinking agent. Crosslinking agents include oxygen and solid or liquid crosslinking agents such as peroxides or sulfur.

When oxygen is used as a crosslinking agent, the oxygen can be provided in the form of a gas as either pure oxygen or in a mixture of gases. Where a mixture of gases is used, oxygen can be combined with inert gas such as nitrogen, helium, argon, or the like. Other gases can be present, for example carbon dioxide or the like. In an embodiment, air is used. The crosslinking can be carried out at ambient pressure, at a partial pressure lower than ambient, or at elevated pressures (greater than 1 atmosphere).

Peroxides can be used for crosslinking, for example organic peroxides such as ketone peroxides, diacyl peroxides, dialkyl peroxides, peroxyesters, peroxyketals, hydroperoxides, peroxydicarbonates, and peroxymonocarbonates. Examples of specific peroxides include 2,2-bis(t-butylperoxy)butane, 1,3 1,4-bis(tert-butylperoxyisopropyl)benzene, dicumyl peroxide, tert-butylcumylperoxide, 2,5-dimethyl-2,5-di-(tert-butylperoxy)hexane, n-butyl-4,4'-di(tert-butylperoxy)valerate, 1,1'-di(tert-butylperoxy)-3,3,5-trimethylcyclohexane, and the like; or inorganic peroxides such as calcium peroxide, zinc peroxide, hydrogen peroxide, peroxydisulfate salts, and the like. Commercially available peroxides include those marketed by Arkema, Inc. under the tradename DI-CUP® including, DI-CUP® dialkyl peroxide, DI-CUP® 40C dialkyl peroxide (on calcium carbonate support), DI-CUP® 40K dialkyl peroxide, DI-CUP® 40KE dialkyl peroxide; and alkyl diperoxy compounds including 2,5-dimethyl-2,5-di(t-butylperoxy) hexane and marketed by Akzo-Nobel under the tradename TRIGONOX® 101. Effective amounts of peroxides can be readily determined by one of skill in the art depending on factors such as the reactivity of the peroxide and the polyarylene, the desired degree of cure, and like considerations, and can be determined without undue experimentation. For example, peroxides can be used in amounts of about 1 to about 10 parts per 100 parts by weight of the polyarylenes. Sulfur can also be used for crosslinking, for example elemental sulfur. Combinations of the foregoing crosslinking agents can be used.

Other agents to initiate or accelerate cure as are known in the art can also be present, for example amine accelerators, sulfonamide accelerators, and the like. Effective amounts of crosslinking agent, activators, and the like are known in the art and can be determined without undue experimentation.

As with oxygen, the crosslinking in the presence of a peroxide, sulfur, or other molecular crosslinking agent can be carried out at ambient pressure, at a partial pressure lower than ambient, or at elevated pressures (greater than 1 atmosphere). When peroxides, sulfur, or another solid or liquid crosslinking agent is used, the agent is generally compounded with the polyarylenes, which are then optionally shaped and crosslinked. The crosslinking agent can be pre-dispersed in a masterbatch and added to the polyarylenes to facilitate mixing.

Crosslinking with oxygen, peroxides, sulfur, or other crosslinking agents is thermally induced, and thus is carried out at elevated temperatures for a time and at a pressure effective to achieve the desired degree of crosslinking. For example, crosslinking is carried out at about 150 to about 600° C. (or higher), about 200 to about 500° C., or more specifically about 300 to about 450° C. The crosslinking is conducted for a total time of about 200 hours or less, about 72 hours or less, about 48 hours or less, or about 1 to about 48 hours. In an embodiment, crosslinking is conducted at about 350 to about 375° C. for about 1 to about 20 hours, specifically about 2 to about 6 hours, in air atmosphere at ambient pressure. When the polyarylene is molded prior to crosslinking, the polyarylene may be first molded at high temperature (e.g., 200-500° C., or 300 to 450°), followed by crosslinking as described above. If the crosslinking temperature is close to or at the thermal decomposition temperature, a combination of crosslinking temperature and time is used such that during crosslinking, the crosslinked polyarylene exhibits a weight loss of less than 10%, specifically less than 5% weight loss, and more specifically less than 1% weight loss.

The degree of crosslinking can be regulated by controlling reaction parameters such as crosslinking temperature, crosslinking time, and crosslinking environment, for example, varying the relative amounts of the polyarylenes and oxygen or oxidants. Degree of cure can be monitored using a number of methods. For example, the polyarylenes for crosslinking are linear amorphous thermoplastics that are dissolvable in polar, aprotic solvents such as N-methyl-2-pyrrolidone (NMP) or N,N-dimethylformamide (DMF). Once crosslinked, these polymers do not dissolve in solvents such as NMP or DMF. In an advantageous feature, solubility can be used to examine whether or not a polymer is crosslinked. Other methods that can be used to examine molecular crosslinking include Dynamic Mechanical Analysis (DMA). This method monitors and records material modulus at different temperatures. For linear amorphous thermoplastic polymers, the modulus drops to near zero when the temperature is increased to above the Tg. Material tends to flow at high temperature above Tg. In contrast, crosslinked polymers will maintain a rubber-like plateau having relatively high modulus at a wide temperature range above its glass transition temperature. The crosslinked polyarylenes are partially crosslinked as described above.

Crosslinking can be partial, i.e., localized, or full across the mass of the polyarylene. Localized cure can be achieved based on the degree of exposure of the polyarylenes to the crosslinking agent (e.g., oxygen) during crosslinking. For example, where the polyarylenes are provided as a pellet or particle, partial cure may be obtained where only the outermost, exposed surface or layer of a particle of the crosslinked polyarylene is crosslinked, while the interior of the pellet or particle is uncrosslinked. The portion crosslinked, in this instance, corresponds to the diffusion depth of the oxygen into the pellet or particle during cure, and varies with variation in cure condition, i.e., temperature, pressure, oxygen concentration, and time.

When polyarylene is cured with oxygen in the air, it has been found that when attempting to make a molded part the surface is found to be crosslinked, but the internal portion of the materials is not crosslinked, resulting in non-uniformity within the material. It has been discovered that addition of a small amount of an oxidant such as magnesium peroxide will result in crosslinking for molded polyarylene parts. Unlike other organic or inorganic peroxides such as dicumyl peroxide, benzoyl peroxide, zinc peroxide, calcium peroxide, etc., magnesium peroxide decomposes at much higher temperature at 350° C., and releases oxygen upon decomposition. It is also discovered herein that a small amount of sulfur will also result in crosslinking for molded polyarylene parts. Full cure of a pellet, particle, or molded part thus may be more readily attained where a crosslinking agent such as a peroxide is incorporated into the polyarylenes.

In another embodiment, the polyarylenes are compounded with an additive prior to crosslinking and then crosslinked. "Additive" as used herein includes any compound added to the polyarylenes to adjust the properties of the crosslinked polyarylenes, for example a blowing agent to form a foam, a filler, or processing aid, provided that the additive does not substantially adversely impact the desired properties of the crosslinked polyarylenes, for example corrosion resistance at high temperature.

Fillers include reinforcing and non-reinforcing fillers. Reinforcing fillers include, for example, silica, glass fiber, carbon fiber, or carbon black, which can be added to the polymer matrix to increase strength. Non-reinforcing fillers such as polytetrafluoroethylene (PTFE), molybdenum disulfide ($MoS_2$), or graphite can be added to the polymer matrix to increase the lubrication. Nanofillers are also useful, and are reinforcing or non-reinforcing. Nanofillers, such as a carbon nanotubes, nanographenes, nanoclays, polyhedral oligomeric silsesquioxane (POSS), or the like, can be incorporated into the polymer matrix to increase the strength and elongation of the material. Nanofillers can further be functionalized to include grafts or functional groups to adjust properties such as solubility, surface charge, hydrophilicity, lipophilicity, and other properties. Combinations comprising at least one of the foregoing fillers can be used.

A processing aid is a compound included to improve flow, moldability, and other properties of the crosslinked thermoplastic material. Processing aids include, for example an oligomer, a wax, a resin, a fluorocarbon, or the like. Exemplary processing aids include stearic acid and derivatives, low molecular weight polyethylene, and the like. Combinations comprising at least one of the foregoing fillers can be used.

The polyarylenes can be crosslinked alone or in the presence of another polymer in order to obtain the desired properties of the crosslinked product. However, the presence of other polymers may reduce chemical resistance. Thus, in an embodiment, no other polymer is present during crosslinking. If used, in order to maintain the desired properties of the crosslinked polyarylenes, any amount of the additional polymers are limited, being present for example in amount of 0.01 to 20 weight percent (wt %), 0.1 to 10 wt %, or 1 to 5 wt % of the total weight of the polymers present. For example, if used, aromatic thermoplastic polymers can be present, such as aromatic polyamides, polyimides, polyetherimides, polyphenylene sulfides (PPS), polyaryletherketones (PAEK), polyetherether ketones (PEEK), polyether sulfones (PESU), polyphenylene sulfones (PPSU), polyphenylene sulfone ureas, or the like, or combinations comprising at least one of the foregoing. Polymers containing oxygen include, for example, acetal resins (e.g., polyoxymethylene (POM)), polyester resins (e.g., poly(ethylene terephthalate) (PET), poly(butylene terephthalate) (PBT), and poly(ethylene naphthalate) (PEN)), polyarylates (PAR), poly(phenylene ether) (PPE), polycarbonate (PC), aliphatic polyketones (e.g., polyketone (PK)), poly(ether ketones) (polyetherketone (PEK), polyetherketoneketone (PEKK), and polyetherketone etherketone ketone (PEKEKK)), and acrylic resins (e.g., polymethylmethacrylate (PMMA)) can be used. The additional polymer can be linear or branched, homopolymers or copolymers, and used alone or in combination with one or more other aromatic thermoplastic polymers. Copolymers include random, alternating, graft, and block copolymers, the block copolymers having two or more blocks of different homopolymers, random copolymers, or alternating copolymers. The thermoplastic polymers can further be chemically modified to include, for example, functional groups such as halogen, alcohol, ether, ester, amide, etc. groups, or can be oxidized, hydrogenated, and the like. A reactive elastomer or fluoropolymer can be blended with the polyarylenes before crosslinking, and graft to the polyarylenes during crosslinking to increase flexibility of the crosslinked polyarylenes. Examples of reactive elastomers or fluoropolymers include polytetrafluoroethylene (PTFE), nitrile-butyl rubber (NBR), hydrogenated nitrile-butyl rubber (HNBR), high fluorine content fluoroelastomers rubbers such as those in the FKM family and marketed under the tradename VITON® fluoroelastomers (available from FKM-Industries) and perfluoroelastomers such as FFKM (also available from FKM-Industries) and marketed under the tradename KALREZ® perfluoroelastomers (available from DuPont), and VECTOR® adhesives (available from Dexco LP), organopolysiloxanes such as functionalized or unfunctionalized polydimethylsiloxanes (PDMS), tetrafluoroethylene-propylene elastomeric copolymers such as those marketed under the tradename AFLAS® and marketed by Asahi Glass Co., ethylene-propylene-diene monomer (EPDM) rubbers, polyvinylalcohol (PVA), and the like, and combinations comprising at least one of the foregoing polymers.

Prior to crosslinking, or after partial crosslinking, the polyarylenes can optionally be shaped to provide a preform that is then crosslinked or further crosslinked. As described in more detail below, crosslinking renders the polyarylenes insoluble in most solvents. The high glass transitions temperatures of the polyarylenes also renders them non-thermoplastic. For some applications, therefore, it is advantageous to first shape the polyarylenes into the desired article prior to crosslinking. A variety of methods can be used to shape the polyarylenes, for example, molding, casting, extruding, foaming, and the like. Accordingly, in an embodiment, an article is manufactured by optionally compounding the polyarylene with a crosslinking agent and one or more optional additives; shaping the optionally compounded polyarylene to form a preform; and crosslinking the polyarylenes to form the article.

When shaping is casting, for example to form a film, the polyarylenes can be dissolved in a polar solvent such as N-methyl-2-pyrrolidone (NMP), or the like to adjust the viscosity.

Alternatively, the crosslinked polyarylenes can be shaped after crosslinking is complete by physical means such as cutting, grinding, or machining.

The polyarylenes can also be shaped by foaming, and then crosslinked after foaming, or after the foam is further shaped, for example by casting or molding the blown foam. For example the polyarylenes can be extruded with 1 to 10 wt % of a chemical or physical blowing agent, such as water, an inert gas (e.g., argon or nitrogen), C1-C6 hydrochlrorofluorocarbons, C1-C6 hydrocarbons (e.g., propane or butane), C1-C5 alcohols (e.g., methanol or butanol), C1-C4 ketones (e.g., acetone), and the like. A nucleating agent can be present to regulate the size and number of cells. Alternatively, particulate water-soluble salts, for example sodium chloride, potassium chloride, potassium iodide, sodium sulfate, or other salt having a high solubility in water can be used to form pores, wherein the polyarylene containing the salts is crosslinked, and the salts are removed after crosslinking, for example by soaking and/or extracting the salts from the crosslinked polyarylene with a suitable solvent (such as water, where a water-soluble nucleating agent is used) to form pores. In an embodiment, the foams are closed cell foams where the voids in the foam that are not in communication but contain a fluid, which is a gas or liquid. Examples of the fluid include air, inert gas, sulfur-containing compounds, oxygen-containing compounds, or a combination thereof. The fluid can be from a blowing agent or entrapment of, e.g., ambient gases in the closed cells. Without being bound by theory, a crosslinked closed-cell polyarylene foam may have a shorter recovery time from its compacted shape because of additional stored energy due to the compression of the fluid in the closed cells. Alternatively, the crosslinked polyarylenes foams can be shaped after crosslinking is complete by physical means such as cutting, grinding, or machining.

In another embodiment, the polyarylenes can be manufactured to form shape memory materials, i.e., having thermally activated shape memory properties wherein the material is thermally activated between an actuated and unactuated shape. In this embodiment, the shape memory crosslinked polyarylenes can be manufactured by optionally compounding the polyarylene with a crosslinking agent and one or more optional additives; compacting the optionally compounded polyarylene at a low temperature (e.g., 50° C. or less, or room temperature); crosslinking the compacted polyarylene described above; compression molding the crosslinked polyarylene at a temperature at or above the Tg of the crosslinked polyarylene to form a crosslinked polyarylene; allowing crosslinked polyarylene having the actuated shape to cool in the mold, or de-molding at the temperature at or above the Tg of the crosslinked polyarylene and allowing the crosslinked polyarylene to cool after demolding to provide a crosslinked polyarylene having an actuated shape. The temperature used during crosslinking the polyarylene and the heating at or above the Tg of the crosslinked article can be the same, such that the crosslinking and the heating can be performed in the same step. The crosslinked polyarylene has thermally activated shape memory properties in that heating to at or above the Tg of the crosslinked polyarylene causes the crosslinked polyarylene to assume an unactuated shape. It is also possible to form a shape memory foam by this method, by forming a foam prior to crosslinking.

The crosslinked polyarylenes have a Tg higher than the polyarylenes before crosslinking, for example about 10° C. or more, about 20° C. or more, about 30° C. or more, or about 10 to about 50° C. higher than the Tg of the polyarylene before crosslinking. Thus the crosslinked polyarylenes can have a Tg of about 130° C. or higher, about 150° C. or higher, more specifically about 180° C. or higher, up to about 200° C. Such Tgs are obtained after the polyarylenes reaches the desired degree of cure, e.g., after curing at 400° C. for at least 8 hours.

The crosslinked polyarylenes, for example polyarylenes cured, e.g., at 400° C. for at least 8 hours, can have a storage modulus of greater about 1 megaPascal (MPa) or more, about 1.2 MPa or more, still more specifically about 9.6 MPa or more, up to 39.2 MPa, determined at 250° C., 275° C., 300° C., 325° C., or 350° C.

The crosslinked polyarylenes, for example polyarylenes cured, e.g., at 400° C. for at least 8 hours, can have a thermal decomposition temperature of about 400° C. or higher, up to about 450° C.

The crosslinked polyarylenes have a number of advantageous properties, particularly for use in downhole applications. In an especially advantageous feature, the chemical resistance of the polyarylenes is improved, and at the same time, the elastomeric properties of the polyarylenes are maintained after crosslinking. The polyarylenes can be used continuously at high temperatures and high pressures, for example, 100 to 400° C., or 200 to 340° C. under wet conditions, including highly basic and highly acidic conditions. Thus, the crosslinked polyarylenes resist swelling and degradation of properties when exposed to chemical agents (e.g., water, brine, hydrocarbons, acids such as sulfuric acid, solvents such as toluene, etc.), even at elevated temperatures of up to 400° C., and at elevated pressures (greater than atmospheric pressure) or prolonged periods. Further, the crosslinked polyarylenes have excellent rubbery elasticity (elastomeric properties) at high temperature, i.e., at 180° C. as determined using dynamic mechanical analysis (DMA).

The high temperature elastomeric properties of the crosslinked polyarylenes can be determined using a method referred to herein as the "stress relaxation test." In this method, a sample of material is molded and cut into a thin sheet about 15 mm in length, 5 mm in width and 0.5 mm in thick. An instrument for determining DMA (e.g., an RSA III Dynamic Mechanical Analysis manufactured by TA Instruments, New Castle, Del.), is used to conduct the stress relaxation test. A strip of test sample is clamped between an upper and a lower clamp. The sample is heated to a testing temperature, e.g., 250° C., 300° C., or other temperature. While at that temperature, the instrument quickly applies a designated force to pull the sample to a length a designated percent longer than original length, e.g., 10% longer than the original length. The instrument then holds the sample in fixed deformation and monitors and records the tension or stress within a designated period of the time, e.g., within 500 seconds. A curve of tensile stress-time relaxation is obtained. The initial stress is related to sample's hardness or stiffness and the ending stress is related to the sample's ability to retain original strength. For a typical rigid plastic, the initial stress is high and the ending stress is low; for a typical elastomer, initial stress is low and the ending stress is close to initial stress; for a typical soft, weak material, the initial stress is very low and the ending stress is also very low. The sample's elasticity can also be expressed by the ratio between ending stress and initial stress (in percent). This number reflects how much stress is retained based on initial stress.

Figure 2:
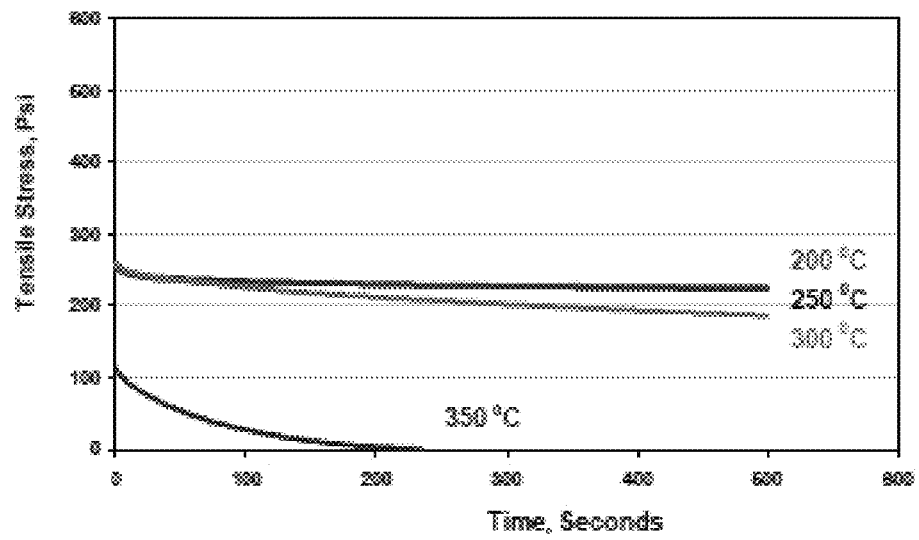
FIG. 2 shows the results of tensile stress relaxation testing of a comparative FFKM perfluoroelastomer at 200° C., 250° C., 300° C., and 350° C.
Figure 3:
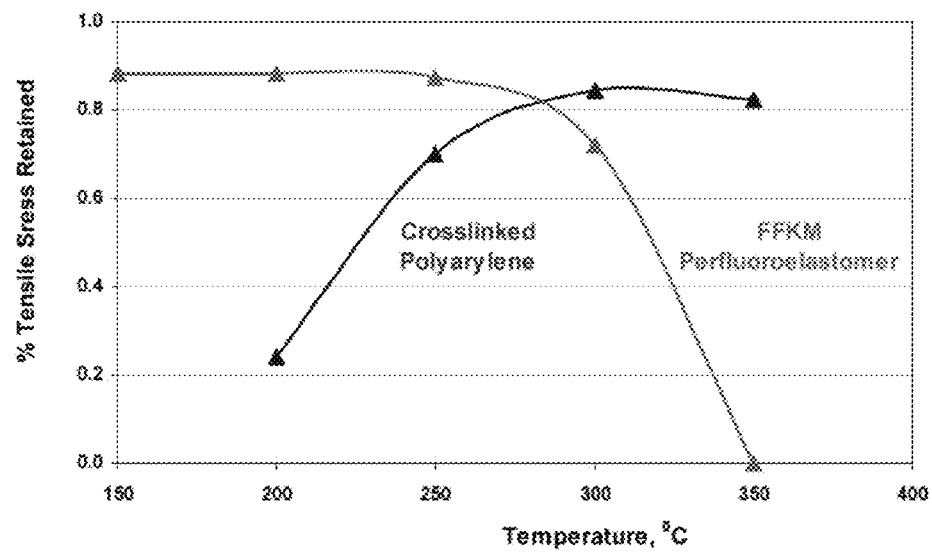
FIG. 3 shows the ratios of ending stress to initial stress at different temperatures for a crosslinked polyarylene and a comparative FFKM perfluoroelastomer.

As shown in FIG. 1, the crosslinked polyarylenes as described herein have been found to be excellent elastomeric materials at high temperature as demonstrated using the tensile stress relaxation test described above. At 200° C., the initial tensile stress is high, decreases quickly in a short period of time, and then slows. These results show that at 200° C., the crosslinked polyarylenes have response similar to a typical thermoplastic material at this temperature. At higher temperatures, such as at 250° C. or above, the initial tensile stress is much lower and the tensile stress is decreased at much lower rate, which is a typical elastomeric behavior. In comparison, results from tensile strength relaxation testing of a sample of a perfluoroelastomer (FFKM, available under the trade name KALREZ, from DuPont) are shown in FIG. 2. The tensile stress relaxation curves of crosslinked polyarylene at 250° C., 300° C., and 350° C. are similar to that of the perfluoroelastomer FFKM at 200° C. and 250° C. It is further observed that the crosslinked polyarylene is actually softer than FFKM, because the tensile stress of the crosslinked polyarylene is lower than that of FFKM. It is also observed that the tensile stress for crosslinked polyarylene increases as temperature increases, while the tensile stress for FFKM decreases as the temperature increases. At 350° C., FFKM becomes very soft and weak, losing strength completely. At the same temperature (350° C.), the crosslinked polyarylene becomes harder and better in elasticity. An alternative comparison, using the ratio of ending stress over initial stress or the percent of stress retained at different temperatures is shown in FIG. 3. As can be seen from FIG. 3, the crosslinked polyarylene has good elastomeric properties at 250° C. or above, while the perfluoroelastomer FFKM only has good elastomeric properties at 300° C. or below.

In addition to excellent elastomeric properties at high temperatures, the crosslinked polyarylenes have excellent chemical resistance. As discussed above, downhole articles such as sealing elements are used under harsh, wet conditions, including contact with corrosive water-, oil-and-water-, and oil-based downhole fluids at high temperature. In order to determine whether a material can survive and retain its original properties (including elasticity and mechanical strength) under conditions of high pressure and continuous service over the length of a lifetime of a well, a comprehensive aging test was developed. The test uses various downhole fluids at high temperature. To predict material performance over a year-long or decade-long time span, accelerated aging tests at much higher temperatures than actual application temperatures were used.

Accordingly, a special aging test configuration is disclosed herein, which uses a graphite bottle with a thread cap. A sample of the material to be tested and the representative downhole fluid are placed inside the graphite bottle and sealed with threaded cap. The sealed bottle is then placed inside a stainless steel pressure vessel rated for a maximum working pressure of 3300 psi (22.75 GPa) at a maximum temperature of 750° F. (399° C.). The pressure vessel is filled with water and then completely closed. The pressure vessel is then placed inside a furnace and heated to a designated temperature. After a designated period of time (hours or days), the pressure vessel is removed from the furnace and cooled to room temperature. The aged samples are removed from the graphite bottle and evaluated, for example using the tensile stress relaxation method described above. Comparisons can be made for un-aged samples and aged samples or comparisons can be made for aged samples under different conditions such as different temperatures and/or times.

Figure 4:
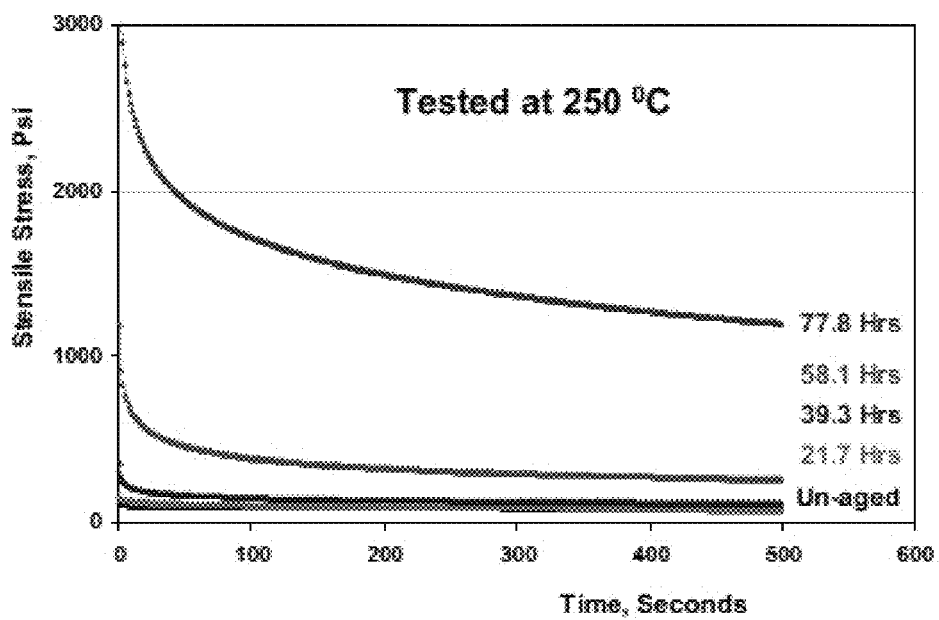
FIGS. 4 and 5 show the results of tensile stress relaxation testing at 250° C. and 300° C., respectively for the crosslinked polyarylene sample after aging in a cesium acetate solution of pH=10 at 300° C. (572° F.) for the indicated number of hours.
Figure 5:
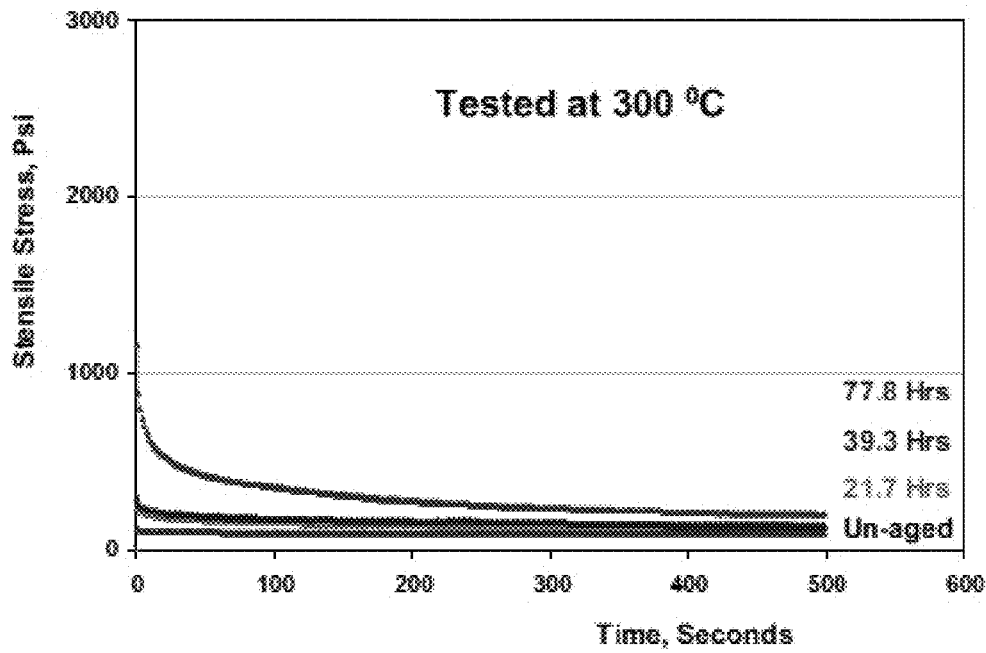
Figure 6:
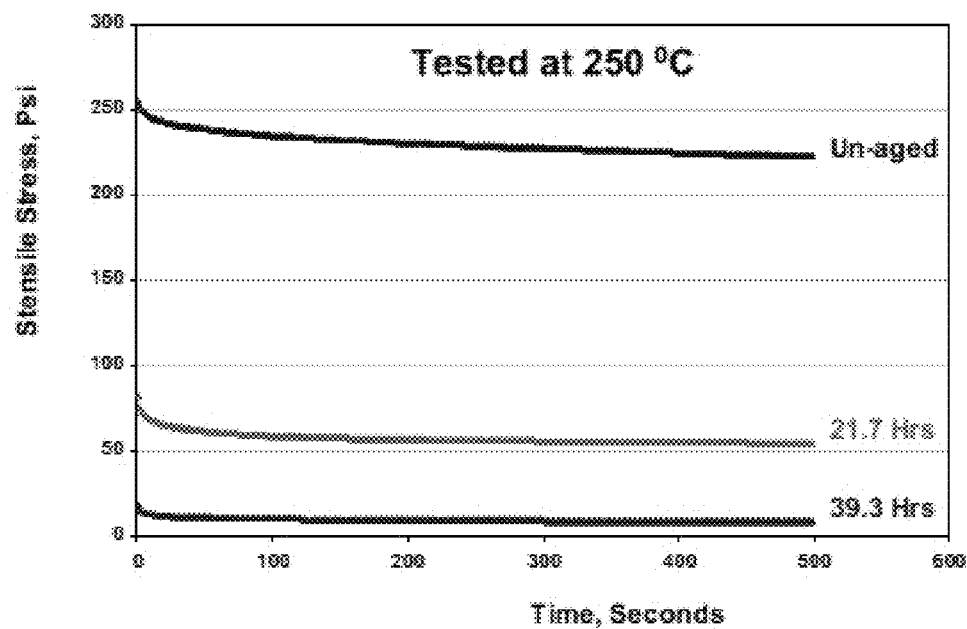
FIGS. 6 and 7 show the results of tensile stress relaxation testing at 250° C. and 300° C., respectively for the FFKM perfluoroelastomer sample after aging in a cesium acetate solution of pH=10 at 300° C. (572° F.) for the indicated number of hours.
Figure 7:
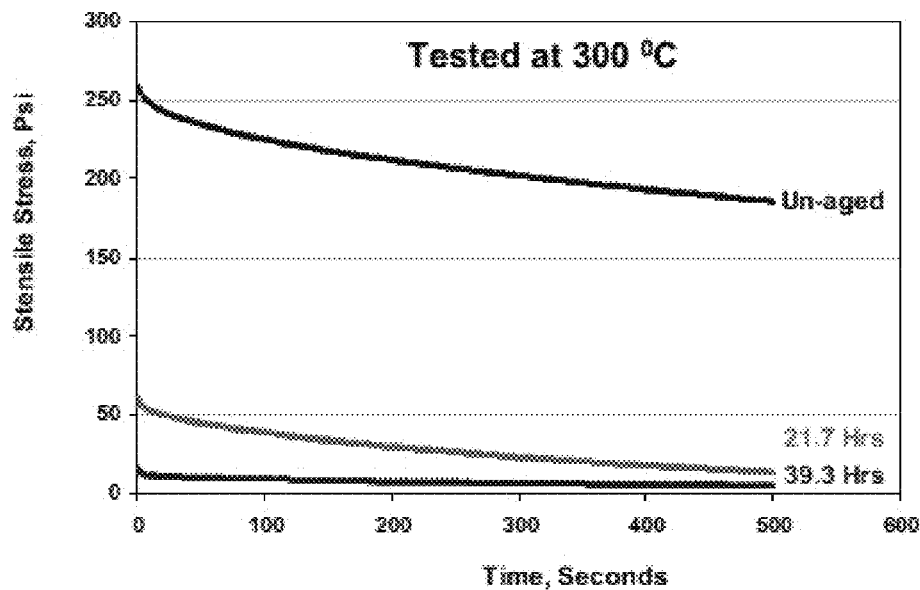
Figure 8:
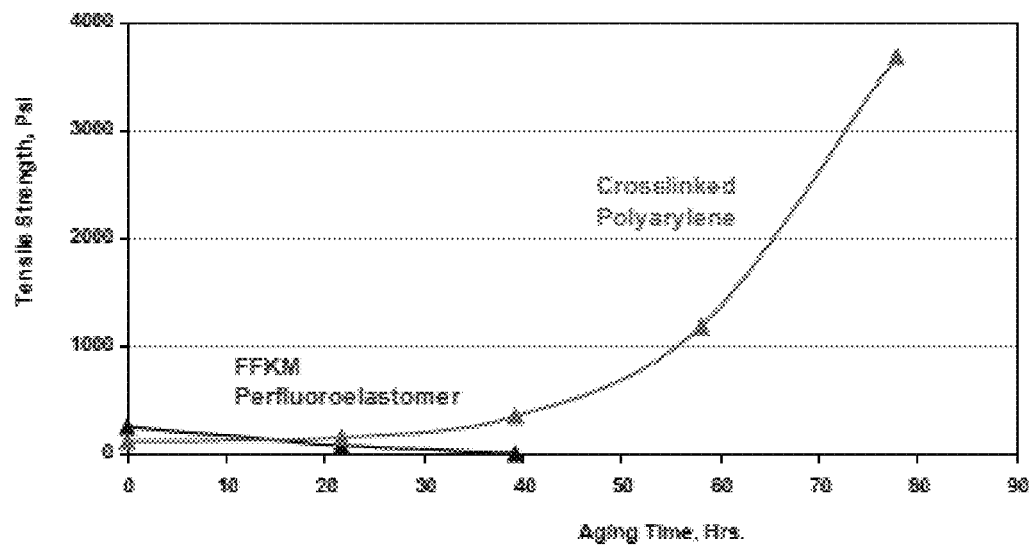
FIG. 8 shows a comparison of initial tensile strength from the tensile stress relaxation testing of the crosslinked polyarylene and a comparative FFKM perfluoroelastomer after aging at a cesium acetate solution of pH=10 at 300° C. (572° F.) for the indicated number hours; tests were performed at 250° C.
Figure 9:
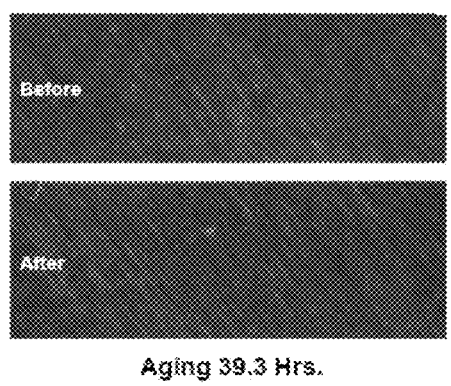
FIGS. 9 and 10 show the effect of aging the crosslinked polyarylene sample in a cesium acetate solution of pH=10 at 300° C. (572° F.) for 39.3 hours.
Figure 10:
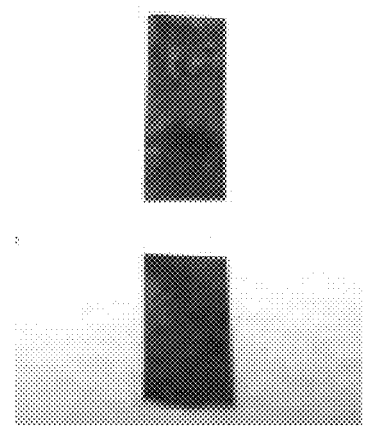
Figure 11:
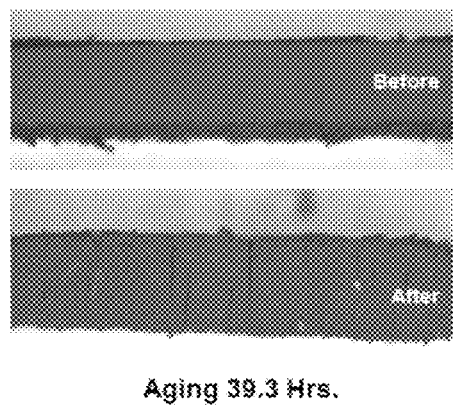
FIGS. 11 and 12 show the effect of aging the comparative FFKM perfluoroelastomer sample after aging at a cesium acetate solution of pH=10 at 300° C. (572° F.) for 39.2 hours.
Figure 12:
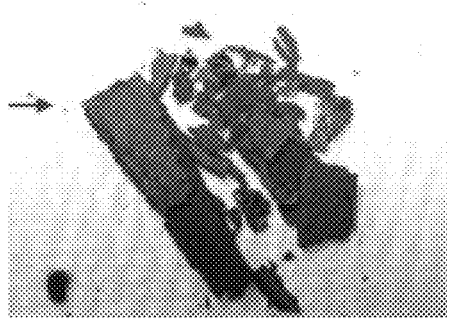
Figure 13:
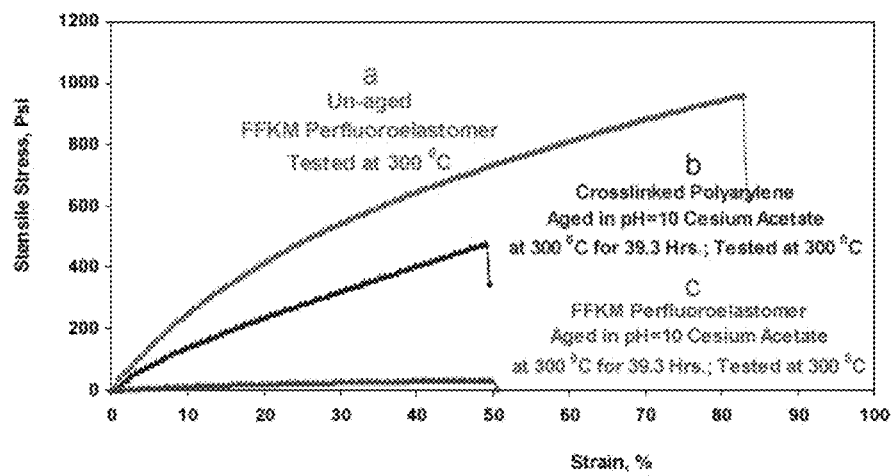
FIG. 13 shows tensile testing results at 300° C. for (a) un-aged FFKM perfluoroelastomer and (b) the crosslinked polyarylene and (c) the perfluoroelastomer FFKM sample after aging in a cesium acetate solution of pH=10 at 300° C. (572° F.) for 39.3 hours.

In a specific embodiment, it has been discovered that the crosslinked polyarylenes disclosed herein exhibit outstanding corrosion resistance, that is, retention of their original mechanical properties (such as elasticity, modulus, and/or integrated strength) after contact with highly corrosive downhole fluids (cesium acetate having pH=10) at temperatures as high as 250° C., 300° C., 325° C., or higher. In a particularly surprising feature, tensile stress relaxation testing of crosslinked polyarylene samples aged at 300° C. in one the most aggressive downhole fluids (cesium acetate having pH=10) shows that crosslinked polyarylene strengthens by itself over the aging process. As shown in FIG. 4 (testing at 250° C.) and FIG. 5 (testing at 300° C.), the modulus or tensile stress actually increases as the aging process progresses. In contrast, FIGS. 6 and 7 show the results of tensile stress relaxation testing at 250° C. and 300° C., respectively for the FFKM perfluoroelastomer sample after aging in a cesium acetate solution of pH=10 at 300° C. (572° F.) for the indicated number of hours. Furthermore, as shown in FIG. 8, initial the tensile strength of FFKM (KALREZ) decreases from the original un-aged value of 254.3 psi (1753 MPa) to 17.6 psi (1213 MPa) after aging at 300° C. in cesium acetate fluid, pH=10, for 39.6 hours, which is a decrease of 93.0%. Surprisingly, the crosslinked polyarylene actually increases its initial tensile strength from the original un-aged value of 114.6 psi (5926 MPa) to 1157.1 psi (59839 MPa), an increase of 900%, after aging for a longer length of time (59 hours), and an increase to above 3500 psi after 77.8 hours. Furthermore, the crosslinked polyarylene maintains its structural integrity after aging as shown in FIG. 9 and FIG. 10, whereas the perfluoroelastomer FFKM becomes soft and also develops cracks as aging process is progressing as shown in FIG. 11 and FIG. 12. Tensile testing results confirmed that the aged crosslinked polyarylene has significantly better mechanical strength than aged FFKM. It was also confirmed that aged FFKM loses mechanical strength significantly, compared to un-aged perfluoroelastomer FFKM, as shown in FIG. 13.

Figure 14:
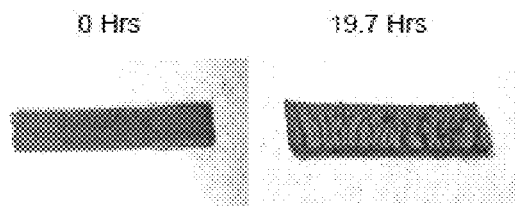
FIG. 14 shows the results of the effect of aging a comparative FFKM perfluoroelastomer sample in a cesium acetate solution of pH=10 at 325° C. for 19.7 hours.
Figure 15:
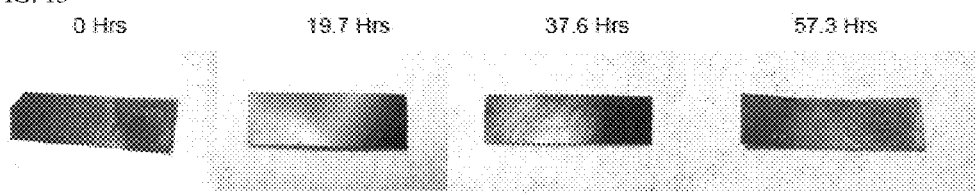
FIG. 15 shows the results of the effect of aging the crosslinked polyarylene sample in a cesium acetate solution of pH=10 at 325° C. for up to 57.3 hours.

When aged under still more aggressive conditions (325° C. in buffer solution, pH=10), FFKM developed cracks within 19.7 hours as shown in FIG. 14. In contrast, the crosslinked polyarylene showed no sign of degradation even after a much longer aging time (57.3 hours) as shown in FIG. 15.

Figure 16:
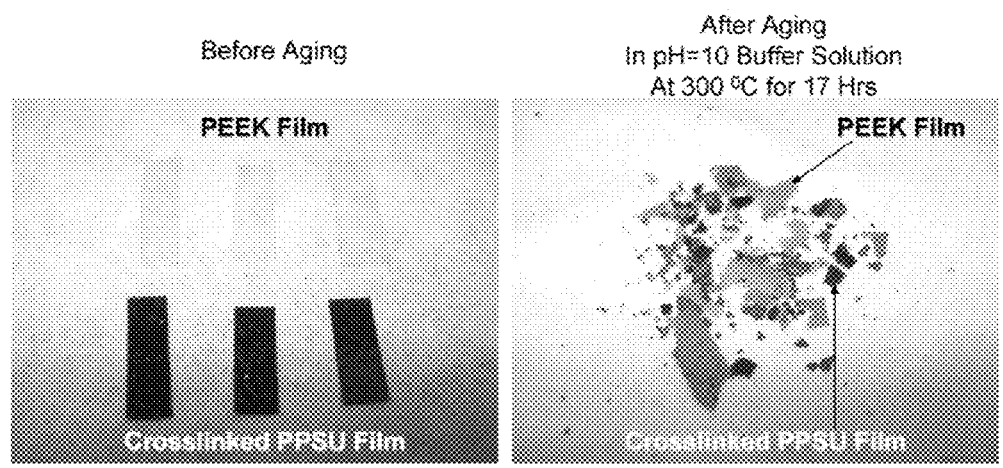
FIG. 16 shows the results of the effect of aging a comparative PEEK and comparative crosslinked PPSU sample in a cesium acetate solution of pH=10 at 300° C. (572° F.) for up to 17 hours.

Similarly, as shown in FIG. 16, when a polyetheretherketone (VICTREX® PEEK from Victrex) and PPSU crosslinked in the presence of a peroxide were aged at 300° C. in buffer solution at pH=10 for 17 hours, both polymers were destroyed.

The crosslinked polyarylenes are useful for preparing elements for downhole applications, such as a packer element, a blow out preventer element, a submersible pump motor protector bag, a sensor protector, a sucker rod, an O-ring, a T-ring, a gasket, a sucker rod seal, a pump shaft seal, a tube seal, a valve seal, a seal for an electrical component, an insulator for an electrical component, a seal for a drilling motor, or a seal for a drilling bit, or other downhole elements.

In an embodiment, a downhole seal, e.g., a packer element, includes a crosslinked polyarylene as described above. In an embodiment, the downhole seal is made by molding a crosslinked polyarylene to form a preform; and crosslinking the preform to form the downhole seal.

In a specific embodiment the article, for example the downhole seal, can be a shape memory seal manufactured using the methods described above, for example by compression molding the polyarylene, optionally compounded with a crosslinking agent or an additive; heating at a temperature that is at or above the Tg of the crosslinked polyarylene and that is effective to crosslink the polyarylene; and demolding the seal at a temperature at or above the Tg of the crosslinked polyarylenes to provide the shape memory seal having a first shape. In use, the seal is first installed at low temperature (e.g., at room temperature or below the Tg of the crosslinked polyarylenes) and thus having its first shape; downhole, the seal is exposed to temperatures at or above the Tg of the crosslinked polyarylenes, and thus assumes a second shape, for example a shape that effectively seals or occludes. Of course, other shape memory articles for downhole use can also be manufactured using this general method.

Alternatively, the elements can be manufactured from the crosslinked polyarylenes by preparing the crosslinked polyarylenes in particle or bulk form; comminuting the bulk form to particulates; optionally compounding the particulates with an additive; and forming the element from the compounded particulates, for example by molding, extrusion, or other methods. Comminuting the bulk crosslinked polyarylenes can be by any method, for example use of a mortar and pestle, ball mill, grinder, or the like, provided that the particle size of the resultant polymer is suitable for adequate mixing. The particle size is not particularly limited, for example the crosslinked polyarylenes are produced or comminuted to a particle size of about 10 mesh or less, about 20 mesh or less, or about 40 mesh or less. The particles can be compounded with additional crosslinking agents, any of the additives described above, or other additives ordinarily used for the intended element.

In a specific embodiment, particles are used to form shape memory articles. In this process, a shape memory article is manufactured by preparing the crosslinked polyarylenes prepared in particle or bulk form; comminuting the bulk form to provide particulates; optionally compounding the particulates with an additive; compression molding the optionally compounded particulates at a temperature at or above the Tg of the crosslinked polyarylenes (for example, greater than about 180° C., or about 200 to about 300° C.) to form the article; and cooling the article in the mold or removing the article from the mold at or above the Tg of the crosslinked polyarylenes and allowing it to cool.

The above embodiments are further demonstrated in the following Examples, which are intended as illustrative only and are not intended to be limited thereto.

EXAMPLES

Example 1

Crosslinking of a Polyarylene by Oxygen

A thermally crosslinked polyphenylene was manufactured by mixing a polyphenylene powder obtained from company Solvay Advanced Polymers under the commercial name PrimoSpire®, with magnesium peroxide in an amount of about 0.5% to about 5% by weight, based on the total weight of the polyphenylene powder. The mixture containing the two powders, polyphenylene and peroxide, was heated to about 375° C. for about 8 hours. A small of piece of material was cut and placed in a solvent such as N-methyl-2-pyrrolidone (NMP) or N,N-dimethylformamide (DMF). In differentiation from the original linear amorphous polyphenylene, which is easily dissolved in solvent, the crosslinked polyphenylene was not dissolved in the solvent, which confirms whether molecular crosslinking has occurred. Alternatively, DMA can be used to determine whether or not the resultant polyphenylene is crosslinked as described above.

Example 2

Crosslinking and Molding of a Polyarylene by Oxygen and Sulfur

A thermally crosslinked polyphenylene was manufactured by mixing a polyphenylene powder obtained from company Solvay Advanced Polymers under the commercial name PrimoSpire® with an magnesium peroxide in an amount of about 0.5% to about 5% by weight, based on the total weight of the polyphenylene powder. The equipment for mixing these powders, polyphenylene is not critical, and can be, for example, a single- or double-bladed KITCHENAID mixer or RESODYN mixer from Resodyn Corporation. The mixture containing the polyphenylene, magnesium powders, and sulfur was poured into a mold containing a bottom plate and a center ring, and then placed inside an oven to heat to 150° C. for two hours; followed by 250° C. for 2 hours and finally heated to 375° C. for 2 hours. The mold containing the mixture was removed from the oven, and a center rod, which was pre-heated to 375° C., was placed inside the center ring, followed by compressing via a 100-ton four column hydraulic compression press. After the mold assembly cooled to room temperature, a top steel plate was placed and four screw nuts locked the center rod to the center ring. The mold assembly was then placed inside oven and cure was continued for at least 20 hours at temperature 325° C. After cooling, the resultant crosslinked polyarylene was removed from mold. The crosslinked polyphenylene was a void-free, rigid, and strong solid. It can be further machined to a desired shape and size. Tools such as bandsaw and hacksaw can be used to cut the molded material into strips for evaluation as described above. In contrast to the original linear amorphous polyphenylene, the crosslinked polyphenylene product is not soluble in solvents such NMP, which was used to confirm that molecular crosslinking occurred. The crosslinked polyphenylene also shows rubber-like plateau having relatively high modulus at a wide temperature range above Tg. The Tg was found to have increased from 120° C. for the original linear amorphous polyphenylene to 180° C. for the crosslinked polyphenylene, as determined using DMA.

The use of the terms "a," "an," "the," and similar referents in the context of the description and the claims are to be construed to cover both the singular and the plural, unless otherwise indicated herein or clearly contradicted by context. The terms "first," "second," and the like herein do not denote any order, quantity, or importance, but rather are used to distinguish one element from another. All ranges disclosed herein are inclusive of the endpoints, and the endpoints are independently combinable with each other.

As used herein, "combination" is inclusive of blends, mixtures, alloys, reaction products, and the like. "Elastomer" as used herein is a generic term for substances emulating natural rubber in that they stretch under tension, have a high tensile strength, retract rapidly, and substantially recover their original dimensions. The term includes combinations (physical mixtures) of elastomers, as well as copolymers, terpolymers, and multi-polymers.

"Hydrocarbyl" as used herein means a group containing carbon and hydrogen, which can be linear, branched, or cyclic, can optionally contain unsaturation, can optionally be halogenated (including perhalogenated), specifically fluorinated (including perfluorinated), and can optionally be substituted with up to three substituents wherein the substituents are each independently a C1-C6 alkyl, C1-C6 perfluoroalkyl, C6-C12 phenyl, C7-C13 arylalkylene (e.g., benzyl), or C7-C13 alkylarylene.

All references are incorporated herein by reference.

While one or more embodiments have been shown and described, modifications and substitutions may be made thereto without departing from the spirit and scope of the invention. Accordingly, it is to be understood that the present invention has been described by way of illustrations and not limitation.

What is claimed is:

1. A crosslinked product of a polyarylene of formula (1)

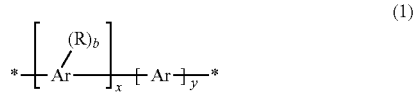

wherein
each Ar is the same or different, and is independently a C6-C32 aromatic group having only carbon atoms in the ring,
R is a substituent on the aromatic group wherein each R is the same or different, and each R is independently a C1-C20 hydrocarbyl group, C1-C20 hydrocarbyloxy group, C1-C20 hydrocarbylthio group, trialkylsilyl group, halogen, nitro group, cyano group, hydroxyl group, mercapto group, hydrocarbyl carbonyl group, formyl group, C1-C20 dihydrocarbyl ether group, carboxylic acid group or a salt thereof, carboxylic ester group, primary, secondary or tertiary amino group, primary or secondary aminocarbonyl group, phosphonic acid group or a salt thereof, sulfonic acid group or a salt thereof, polyalkyleneoxy group, or polyphenyleneoxy group,
b is an integer from 0-10, provided that the valence of Ar is not exceeded;
x and y are the same or different, and either x or y can be zero, provided that x+y is greater than about 10; and
the polyarylene is crosslinked.

2. The crosslinked product of claim 1, wherein the polyarylene is of formula (2)

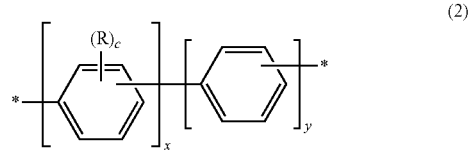

wherein
each R is the same or different, and is as defined in formula (1),
c is an integer from 0 to 4, and
x and y are the same or different, x or y can be zero, provided that x+y is greater than about 10.

3. The crosslinked product of claim 2, wherein each R is the same or different, and is a linear or branched C1-C6 alkyl, C6-C12 arylcarbonyl, or halogen, c is an integer from 1 to 4, and x and y are both greater than zero.

4. The crosslinked product of claim 2, wherein each R is C6-C12 arylcarbonyl, and c is 1.

5. The crosslinked product of claim 1, wherein the polyarylene is of formula (2c)

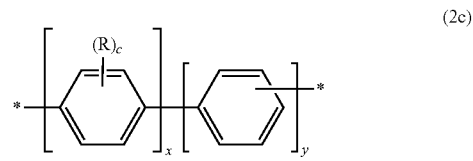

wherein R is benzoyl, c is 1, and both x and y are greater than zero.

6. The crosslinked product of claim 1, having a Tg at least 10° C. higher than the Tg of the polyarylene of formula (1).

7. The crosslinked product of claim 1, having an increased tensile stress after aging at 300° C. in cesium acetate fluid, pH=10 for at least 20 hours.

8. The crosslinked product of claim 1, further comprising a reinforcing filler.

9. The crosslinked product of claim 1, wherein the reinforcing filler comprises one or more of silica, glass fiber, carbon fiber, or carbon black.

10. The crosslinked product of claim 1, in the form of a foam.

11. The crosslinked product of claim 10, further comprising a reinforcing filler.

12. The crosslinked product of claim 11, wherein the reinforcing filler comprises one or more of silica, glass fiber, carbon fiber, or carbon black.

13. The crosslinked product of claim 1, wherein the crosslinked polyarylene is a shape memory material thermally activated between an actuated and unactuated shape.

14. A method for the manufacture of the crosslinked product of a polyarylene of claim 1, the method comprising
heating the polyarylene of formula (1) in presence of a crosslinking agent at a temperature and for a time effective to form the crosslinked polyarylene.

15. The method of claim 14, wherein the crosslinking agent is oxygen, a peroxide, or sulfur.

16. The method of claim 14, wherein the crosslinking is conducted at about 150 to about 400° C. for about 1 to about 200 hours.

17. The method of claim 14, comprising foaming the polyarylene of formula 1 prior to crosslinking.

18. The method of claim 14, comprising shaping the polyarylene of formula 1 prior to crosslinking.

19. The method of claim 14, wherein the crosslinking is conducted at a temperature at or above the glass transition temperature of the crosslinked polyarylene and for a time effective to provide a shape memory crosslinked polyarylene.

20. The method of claim 19, comprising foaming the polyarylene of formula 1 prior to crosslinking.

21. The method of claim 19, comprising shaping the polyarylene of formula 1 prior to crosslinking.

22. A downhole article comprising the crosslinked polyarylene of claim 1.

23. The downhole article of claim 22, further comprising a reinforcing filler.

24. The downhole article of claim 22, wherein the crosslinked polyarylene is a foam.

25. The downhole article of claim 24, further comprising a reinforcing filler.

26. The downhole article of claim 24, wherein the foam is a closed cell foam comprising cells at least partially filled with a fluid.

27. The downhole article of claim 22, wherein the crosslinked polyarylene is a shape memory material thermally activated between an actuated and unactuated shape.

28. A method of forming a downhole article, the method comprising:
   forming a preform of the downhole element comprising the polyarylene of claim 1; and
   heating the preform at a temperature and for a time in presence of a crosslinking agent effective to crosslink the polyarylene to provide the article.

29. The method of claim 28, further comprising forming a foam of the polyarylene and forming the preform with the foam.

30. The method of claim 28, further comprising crosslinking at a temperature at or above the glass transition temperature of the crosslinked polyarylene for a time effective to provide a shape memory crosslinked polyarylene.

31. A method of forming a downhole article, the method comprising
   forming particles comprising the crosslinked polyarylene of claim 1; and
   shaping the particles to provide the article.

32. The method of claim 31, wherein forming the particles comprises
   heating the polyarylene of claim 1 at a temperature and for a time in presence of a crosslinking agent effective to crosslink the polyarylene to provide the crosslinked polyarylene in bulk; and
   comminuting the bulk crosslinked polyarylene to provide the particles.

* * * * *